United States Patent Office 3,635,958
Patented Jan. 18, 1972

3,635,958
4,7-DIHYDRO-2-STYRYL-1,3-DIOXEPINS
Chester E. Pawloski, Bay City, Mich., assignor to The Dow Chemical Company, Midland, Mich.
No Drawing. Filed Nov. 17, 1969, Ser. No. 877,528
Int. Cl. C07d 17/00
U.S. Cl. 260—240 D
2 Claims

ABSTRACT OF THE DISCLOSURE

The present invention is directed to new compounds, namely, 4,7-dihydro-2-styryl-1,3-dioxepins corresponding to the formula:

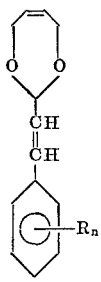

wherein R represents a lower alkyl group of from 1 to about 8, both inclusive, carbon atoms, and $n$ is 0, 1, 2, 3, 4, or 5. The compounds are suitable for use as fungicides and herbicides.

SUMMARY OF THE INVENTION

The present invention is directed to new and useful compounds corresponding to the formula:

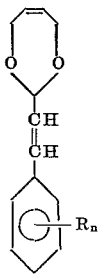

wherein R represents a lower alkyl group of from 1 to about 8, both inclusive, carbon atoms, and $n$ is 0, 1, 2, 3, 4, or 5. The compounds are somewhat soluble in many common organic solvents and have low solubility in water. The compounds have been found to be useful as fungicides and herbicides.

As used herein, the term "lower alkyl" means saturated, monovalent aliphatic radicals, including straight and branched-chain radicals of from 1 to about 8 carbon atoms, as illustrated by, but not limited to, methyl, ethyl, propyl, isopropyl, butyl, sec.-butyl, amyl, hexyl, heptyl, octyl, isooctyl, and the like.

The new compounds are prepared by reacting a predetermined aldehyde corresponding to the formula

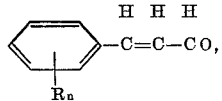

where R and $n$ are the same as set forth hereinbefore, with 1,4-butenediol. The preparation ordinarily is carried out in the presence of an acid catalyst, such as concentrated sulfuric acid or p-toluenesulfonic acid, and a water immiscible solvent such as benzene, toluene, or hexane.

The amount of the reactants to be employed is not critical; however, optimum yields are obtained when employing substantially equimolar proportions of the reactants. The reaction takes place smoothly at a temperature range of from about 75° to 110° C. with the production of the compound and water of reaction. The removal of water of reaction as formed generally results in optimum yields after neutralization and distillation at reduced pressure.

Usually, in carrying out the reaction, the solvent and the acid catalyst are contacted in any convenient fashion and heated to reflux temperature under atmospheric pressure. The aldehyde and the 1,4-butenediol are likewise contacted in any convenient fashion, and are added to the solvent-catalyst mixture. Generally, in carrying out the preparation, the aldehyde and 1,4-butenediol mixture is added dropwise to the solvent-catalyst mixture over a period of time sufficient to assure substantial completion of the reaction.

Upon completion of the reaction, the compound is recovered by conventional procedures. In a representative operation, the reaction mass is neutralized with sodium carbonate and the solvent removed by distillation under reduced pressure.

DESCRIPTION OF PREFERRED EMBODIMENTS

In a representative operation, 200 milliliters of benzene and 0.25 gram of p-toluenesulfonic acid were mixed and heated to reflux under atmospheric pressure. One mole (132 grams) of cinnamaldehyde of the formula:

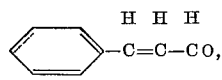

and one mole (88 grams) of 1,4-butenediol were contacted and added dropwise to the refluxing mixture over a time period of about 80 minutes. The refluxing was continued until water of reaction, as formed, ceased to be distilled from the reaction mass. A total of 17 milliliters of water were collected. During this period the temperature of the reaction mixture was maintained in the range of from about 82 to about 104° C. Sodium carbonate was added in an amount sufficient to neutralize the reaction mass, and the product was separated and recovered by distillation of the reaction mass under reduced pressure. The 4,7-dihydro-2-styryl-1,3-dioxepin compound was recovered as a liquid having a boiling point of 115° C. at 0.5 millimeter Hg. The structure was confirmed by infrared spectroscopy analysis.

Following the procedure described for the foregoing example, dioxepins corresponding to the formula:

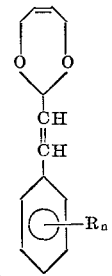

are prepared by reacting 1,4-butenediol with a predetermined aldehyde corresponding to the formula

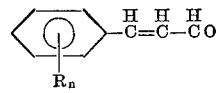

In the above formulas, R represents a lower alkyl group as defined hereinbefore, and $n$ is an integer of from 1 to 5, both inclusive. When $n$ is an integer greater than 1, the alkyl groups can be the same or different.

The preparation of a number of representative compounds of the present invention that are made by the foregoing process is summarized in Table I as follows:

TABLE I

| Prep. No. | Aldehyde reactant | Product Name | Product Formula | Molecular wt. |
|---|---|---|---|---|
| 1 | (3-methylbenzene with -C=C-CO, CH₃ substituent) | 4,7 dihydro-2-(3-methylstyryl)-1,3-dioxepin | (corresponding dioxepin structure) | 215 |
| 2 | (2,5-diamyl benzene with -C=C-CO, C₅H₁₁ substituents) | 4,7-dihydro-2-(2,5-diamylstyryl)-1,3-dioxepin | (corresponding dioxepin structure) | 341 |
| 3 | (2,3,5-tributyl benzene with -C=C-CO, C₄H₉ substituents) | 4,7 dihydro-2-(2,3,5-tributylstyryl)-1,3-dioxepin | (corresponding dioxepin structure) | 369 |
| 4 | (2,3,4,5-tetrapropyl benzene with -C=C-CO, C₃H₇ substituents) | 4,7 dihydro-2-(2,3,4,5-tetrapropylstyryl)1,3-dioxepin | (corresponding dioxepin structure) | 369 |
| 5 | (2,3,4,5,6-pentaethyl benzene with -C=C-CO, C₂H₅ substituents) | 4,7 dihydro-2-(2,3,4,5,6-pentaethylstryl)-1,3-dioxepin | (corresponding dioxepin structure) | 341 |
| 6 | (benzene with C₆H₁₃, CH₃, and -C=C-CO) | 4,7 dihydro-2-(2-methyl-4-hexylstyryl)-1,3-dioxepin | (corresponding dioxepin structure) | 299 |
| 7 | (benzene with C₇H₁₅, CH₃, CH₃-CH-CH₃ (isopropyl), and -C=C-CO) | 4,7 dihydro-2-(2-isopropyl-4-methyl-6-heptylstyryl)-1,3-dioxepin | (corresponding dioxepin structure) | 355 |
| 8 | (benzene with C₈H₁₇, C₂H₅, C₈H₁₇, and -C=C-CO) | 4,7 dihydro-2-(2,6-dioctyl-4-ethylstyryl)-1,3-dioxepin | (corresponding dioxepin structure) | 453 |
| 9 | (benzene with CH₃, CH₂-CH, i-C₄H₉, i-C₈H₁₇, and -C=C-CO) | 4,7 dihydro-2-(2-isooctyl-5,6-isobutylstyryl)-1,3-dioxepin | (corresponding dioxepin structure) | 369 |
| 10 | (benzene with CH₃, C-CH₃, C₂H₅, C₅H₁₁, CH₃, C₃H₇, and -C=C-CO) | 4,7 dihydro-2-(2-propyl-3-methyl-4-amyl-5-ethyl-6-isopropylstyryl)-1,3-dioxepin | (corresponding dioxepin structure) | 395 |

The aldehyde reactant can be obtained from commercial sources or prepared by reacting in a conventional aldol condensation a corresponding aromatic aldehyde of the formula:

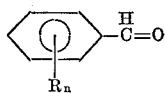

with acetaldehyde $$(CH_3\overset{H}{C}=O)$$

in the presence of mild alkali. This reaction is shown schematically as follows:

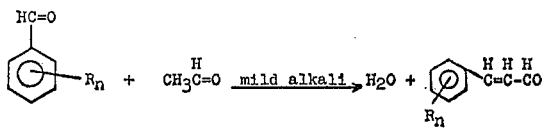

wherein R and $n$ are the same as set forth hereinbefore.

The novel products of the present invention are useful as fungicides and herbicides. When the products are so employed, the unmodified substance can be utilized. However, the present invention also embraces the use of the novel compounds in formulations. Thus, for example, the compounds are dispersible onto a finely divided solid and employed as a dust. Also, the compounds, or a solid composition comprising the compounds, may be dispersed in water, typically with the aid of a wetting agent, and the resulting aqueous suspension employed as a spray. In other procedures, the compounds may be employed as a constituent of organic liquid compositions, oil-in-water or water-in-oil emulsions, or water dispersions, with or without the addition of wetting, dispersing or emulsifying agents.

In representative operations, a bacteriological culture medium containing 500 parts of 4,7-dihydro-2-styryl-1,3-dioxepin per million parts by weight of ultimate composition gave complete inhibition of *Candida albicans*, *Aspergillus terreus*, and *Candida pelliculosa*, while a bacteriological medium containing 100 parts per million of this same dioxepin gave complete inhibition of *Pullaria pullulans* and *Trichophyton mentagrophytes*. Application of 4,7-dihydro-2-styryl-1,3-dioxepin at a concentration of 10 pounds per acre gave substantially complete inhibition of pigweeds.

I claim:
1. A 4,7-dihydro-2-styryl-1,3-dioxepin compound corresponding to the formula:

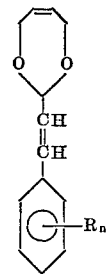

wherein R is a lower alkyl group having from 1 to about 8 carbon atoms and $n$ is an integer of from 0 to 5.

2. The compound of claim 1 which is 4,7-dihydro-2-styryl-1,3-dioxepin.

References Cited
UNITED STATES PATENTS 3,337,587    8/1967    Tinsley et al. _____ 260—338

JOHN D. RANDOLPH, Primary Examiner

U.S. Cl. X.R.

71—81, 88; 260—599; 424—278